(12) United States Patent
Smith

(10) Patent No.: US 12,498,024 B2
(45) Date of Patent: Dec. 16, 2025

(54) ACTUATOR SYSTEMS FOR SOLAR TRACKERS

(71) Applicant: Nextracker LLC, Fremont, CA (US)

(72) Inventor: Andrew Smith, Oakland, CA (US)

(73) Assignee: Nextracker LLC, Fremont, CA (US)

( * ) Notice: Subject to any disclaimer, the term of this patent is extended or adjusted under 35 U.S.C. 154(b) by 602 days.

(21) Appl. No.: 17/942,901

(22) Filed: Sep. 12, 2022

(65) Prior Publication Data

US 2023/0003287 A1    Jan. 5, 2023

Related U.S. Application Data

(63) Continuation of application No. 16/422,361, filed on May 24, 2019, now Pat. No. 11,466,760.

(51) Int. Cl.
*F16H 25/20* (2006.01)
*H02S 20/32* (2014.01)

(52) U.S. Cl.
CPC ... *F16H 25/2018* (2013.01); *F16H 2025/204* (2013.01); *H02S 20/32* (2014.12)

(58) Field of Classification Search
CPC .......... F16H 25/2018; F16H 2025/204; F16H 25/20; H02S 20/32; F24S 30/425; F24S 2030/11; F24S 2030/135; Y02E 10/47; Y02E 10/50
See application file for complete search history.

(56) References Cited

U.S. PATENT DOCUMENTS

| | | | |
|---|---|---|---|
| 5,228,353 A | | 7/1993 | Katahira et al. |
| 6,253,632 B1 | * | 7/2001 | Poulek ............... F16H 25/04 |
| | | | 74/99 A |
| 8,671,930 B2 | | 3/2014 | Liao |
| 8,807,129 B2 | | 8/2014 | Mackamul |
| 10,174,970 B2 | | 1/2019 | Grushkowitz et al. |
| 2014/0216522 A1 | * | 8/2014 | Au ................. F24S 25/10 |
| | | | 136/246 |
| 2018/0175784 A1 | | 6/2018 | Lange et al. |
| 2018/0226915 A1 | | 8/2018 | Henderson et al. |
| 2018/0238072 A1 | * | 8/2018 | Mckinion ............ H01Q 1/1242 |

* cited by examiner

*Primary Examiner* — Michael Y Sun
(74) *Attorney, Agent, or Firm* — Fredrikson & Byron, P.A.

(57) ABSTRACT

A solar tracking system includes a solar array, support beams that support the solar array, a torque tube coupled to the support beams, a base that rotatably supports the torque tube, and an articulation system that rotates the torque tube relative to the base. The articulation system includes an outer tube, a screw rod, and a nut and/or inner tube that rotates and translates along a length of the screw rod as the screw rod rotates. The interior portion of the outer tube includes helical grooves and the exterior portion of the nut or inner tube includes ridges or rollers that mate with the helical grooves, which cause the nut and/or inner tube to rotate as the nut and/or inner tube is translated along a length of the screw rod when the screw rod is rotated by the motor.

6 Claims, 19 Drawing Sheets

ACTUATOR SYSTEMS FOR SOLAR TRACKERS

FIELD

The present disclosure relates to solar systems, and more particularly, to solar tracker actuating systems for adjusting the orientation of the solar system to track the location of the sun.

BACKGROUND

Solar cells and solar panels are most efficient in sunny conditions when oriented towards the sun at a certain angle. Many solar panel systems are designs in combination with solar trackers, which follow the sun's trajectory across the sky from east to west to maximize the electrical generation capabilities of the systems. The relatively low energy produced by a single solar cell requires the use of thousands of solar cells, arranged in an array, to generate enough energy to be usable, for example, as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increasing the size and number of components to reduce torsional excitation is required at varying locations along the length of the solar tracker. The present disclosure seeks to address the shortcomings of prior tracker systems.

SUMMARY

In an aspect, this disclosure features a solar tracking system including a solar array. The solar tracking system also includes support beams configured to support the solar array. The solar tracking system also includes a torque tube coupled to the support beams. The solar tracking system also includes a base configured to rotatably support the torque tube and an articulation system configured to rotate the torque tube relative to the base. The articulation system includes: an outer tube, a screw rod disposed within the outer tube, a nut configured to mate with threads of the screw rod and configured to rotate and translate along a length of at least a portion of the screw as the screw rotates, an inner tube fixedly coupled between the nut and the torque tube, and a motor configured to cause the screw rod to rotate.

In aspects, implementations of this disclosure may include one or more of the following features. Helical grooves may be disposed on an inside portion of the outer tube and respective ridges may be disposed on an outside portion of the nut. The ridges may movably mate with the helical grooves so that the helical grooves rotate the nut as the nut is translated along at least a portion of the length of the outer tube when the screw is rotated by an electric motor.

The articulation system may further include a helical tube coupled between the inner tube and the torque tube. The solar tracking system may also include a helical tube support disposed on the base and configured to slidably support the helical portion of the torque tube. Actuation of the electric motor may cause a helical portion of the torque tube to translate within the helical tube support. The helical tube support may be configured to rotate the helical portion of the torque tube as the helical portion of the torque tube is translated therein to cause a corresponding rotation of the solar array. A rotation and/or length of the helical grooves may match the rotation and/or length, respectively, of the helical tube.

The articulation system may also include first caps disposed at end portions of the ridges of the nut. The first caps and radial sides of the ridges of the nut may form radial ball bearing paths. Sides of the helical grooves of the outer tube and longitudinal sides of the respective plurality of ridges of the nut may form longitudinal ball bearing paths. The longitudinal ball bearing paths may connect the radial ball bearing paths to form a recirculating ball bearing path. Ball bearings may be disposed in the recirculating ball bearing path.

Each of the ridges of the nut may include a first ridge portion, a second ridge portion, and a second cap disposed between the first ridge portion and the second ridge portion. Sides of the first and second ridge portions and respective sides of the second cap may form other longitudinal ball bearing paths. Widths of the first ridge portion and the second ridge portion may be tapered.

The solar tracking system may also include double roller bearings disposed around a non-threaded portion of the screw rod. The solar tracking system may also include a sleeve having a diameter greater than the diameter of the outer tube. An end portion of the sleeve may be coupled to an end portion of the torque tube and the sleeve may be configured to cover the inner tube when the solar tracking system is in an extended position. The articulation system may be coupled to an end portion of the torque tube.

In another aspect, this disclosure features an articulation assembly including an outer tube having helical grooves in an inside portion of the outer tube. The articulation assembly also includes a screw rod disposed within the outer tube. The articulation assembly also includes a nut having threads configured to mate with threads of the screw rod such that rotation of the screw rod drives translation of the nut along a length of at least a portion of the screw rod, and having ridges configured mate with and slide through the helical grooves of the outer tube such that the helical grooves rotate the nut as the nut translates along the length of the at least a portion of the screw rod. The articulation assembly also includes an inner tube fixedly coupled to the nut and configured to fixedly couple to a torque tube coupled to a solar array such that the rotation of the screw rod drives the translation and rotation of the nut, which drives the translation and rotation of the solar array through the inner tube and the torque tube.

In aspects, implementations of this disclosure may include one or more of the following features. The articulation assembly may also include an electric motor, which when activated, causes the screw rod to rotate. The articulation assembly may also include a helical tube coupled to the torque tube. The articulation assembly may also include a helical tube support configured to slidably support the helical tube. Actuation of an electric motor may cause the helical tube to translate within the helical tube support. The helical tube support may be configured to rotate the helical tube as the helical tube is translated in the helical tube support to cause a corresponding rotation of the solar array.

In aspects, the rotation or length of the helical grooves may match the rotation or length, respectively, of the helical tube. The solar tracking system may also include double roller bearings disposed around a non-threaded portion of the screw rod. The solar tracking system may also include a sleeve having a diameter greater than the diameter of the outer tube. An end portion of the sleeve may be coupled to an end portion of the torque tube and the sleeve may be configured to cover the inner tube when the solar tracking system is in an extended position. The articulation assembly may be configured to couple to an end portion of the torque tube.

In another aspect, this disclosure features an articulation assembly including an outer tube having helical grooves on an inside portion of the outer tube. The articulation assembly also includes a screw rod disposed within the outer tube. The articulation assembly also includes a nut having threads configured to mate with threads of the screw rod such that rotation of the screw rod drives translation of the nut along a length of at least a portion of the screw rod, and having rollers disposed on an exterior portion of the nut and configured to mate with and travel through the helical grooves of the outer tube such that the helical grooves cause the nut to rotate as the nut translates along the length of the at least a portion of the screw rod. The articulation assembly also includes an inner tube fixedly coupled to the nut and configured to fixedly couple to a torque tube coupled to a solar array such that the rotation of the screw rod drives the translation and rotation of the nut, which drives the translation and rotation of the solar array through the inner tube and the torque tube.

In aspects, implementations of this disclosure may include one or more of the following features. The rollers may include first rollers disposed around the outside portion of the nut and second rollers disposed around the outside portion of the nut so that the second rollers are radially offset from the second rollers. The articulation assembly may also include a helical tube coupled to the torque tube. The articulation assembly may also include a helical tube support configured to slidably support the helical tube. Actuation of an electric motor may cause the helical tube to translate within the helical tube support. The helical tube support may be configured to rotate the helical tube as the helical tube is translated in the helical tube support to cause a corresponding rotation of the solar array. The rotation or length of the helical grooves may match the rotation or length, respectively, of the helical tube. The solar tracking system may also include a sleeve having a diameter greater than the diameter of the outer tube. An end portion of the sleeve may be coupled to an end portion of the torque tube. The sleeve may be configured to cover the inner tube when the solar tracking system is in an extended position.

In another aspect, this disclosure features an articulation assembly includes an outer tube including tracks extending along a length of an interior portion of the outer tube. The articulation assembly also includes a screw rod disposed within the outer tube. The articulation assembly also includes an inner tube assembly configured to couple to a solar array. The inner tube assembly includes an inner tube, rollers coupled to an exterior of the inner tube and configured to move within the tracks, respectively, and a nut fixedly coupled to the inner tube. The nut has threads configured to mate with threads of the screw rod such that rotation of the screw rod drives translation of the inner tube assembly via the nut. During translation of the inner tube assembly, the tracks guide the rollers to cause the inner tube assembly to rotate and drive the rotation of the solar array.

BRIEF DESCRIPTION OF THE DRAWINGS

Various aspects and features of the present disclosure are described hereinbelow with reference to the drawings, wherein.

DETAILED DESCRIPTION

Figure 1:
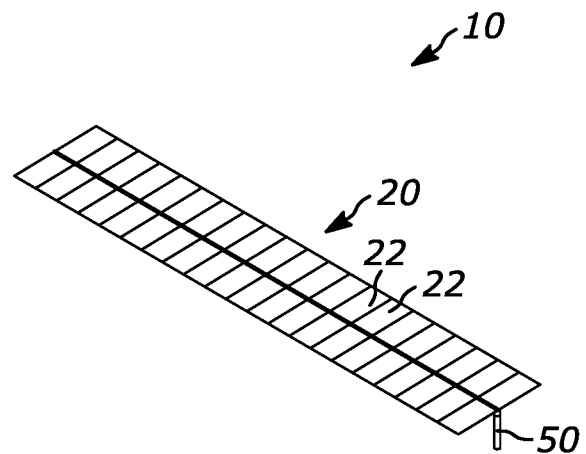
FIG. 1 is a top, perspective view of a solar tracking system provided in accordance with the present disclosure that is configured to articulate the angle of a solar array to track the location of the sun.

The present disclosure is directed to solar tracking systems and methods for articulating a solar tracking system. The solar tracking system includes a solar array, support beams that support the solar array, a torque tube, which includes a helical portion, coupled to the support beams, a base that rotatably supports the helical portion of the torque tube, and an articulation system that rotates the torque tube relative to the base. The articulation system includes an outer tube, a screw rod, a nut that mates with the screw rod and rotates and translates along a length of the screw rod as the screw rod rotates; an inner tube fixedly coupled between the nut and the torque tube, and a motor that causes the screw rod to rotate. Helical grooves or slots are disposed on an inside portion of the outer tube and respective ridges or ribs are disposed on an outside portion of the nut. The ridges mate with the helical grooves which guide the rotation of the nut as the nut is translated or driven along a length of the screw rod when the screw rod is rotated by the motor.

As can be appreciated, utilizing a torque tube having helical grooves together with the screw drive assembly having an outer tube with helical grooves for guiding the rotation of the nut on the screw rod of the present disclosure decreases the play of the nut on the threads of the screw rod, increases the overall stiffness of the articulation system, and inhibits back-driving of the articulation system due to wind loads or static loads such as wildlife, snow, or other objects. The increases stiffness further enables the various components of the solar tracking system to be optimized, thus reducing the amount of material required and reducing costs.

Aspects of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

With reference to FIGS. 1-6, a solar tracking system capable of tracking the location of the sun provided in accordance with the present disclosure is illustrated and generally identified by reference numeral 10. The solar tracking system 10 includes a solar array 20, a plurality of support beams 30 (FIGS. 3-5) that are configured to support the solar array 20, a plurality of torque tubes 40 (FIG. 3-5) that are configured to support the plurality of support beams 30 (FIGS. 3-5), a plurality of bases 50 that are configured to rotatably support the plurality of torque tubes 40, and an articulation system 100 (FIGS. 2, 5, and 6) that is configured to rotate the plurality of torque tubes 40, and therefore the solar array 20, relative to the base 50.

Figure 2:
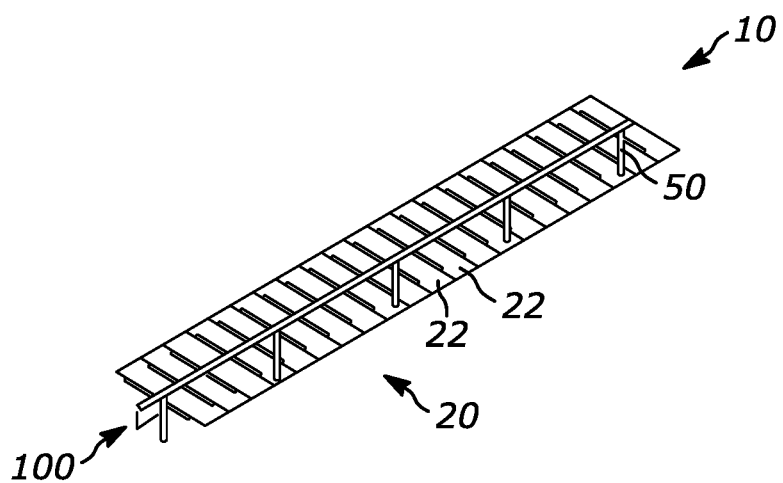
FIG. 2 is a bottom, perspective view of the solar tracking system of FIG. 1.

As illustrated in FIG. 2, the articulation system 100 may be coupled to the South end portion of the solar array 20. In other aspects, the articulation system 100 may be coupled to the North end portion of the solar array 20. Coupling the articulation system 100 to an end portion of the solar array 20 allows for easy access to the articulation system 100 and its controller when, for example, cabling is provided to the articulation system 100 or maintenance is performed on the articulation system 100.

As illustrated in FIGS. 1-4, the solar array 20 includes a plurality of photovoltaic modules 22, each of which is mechanically and electrically coupled to one another, although it is contemplated that each photovoltaic module 22 may be mechanically and/or electrically insulated from one another. In aspects, the photovoltaic modules 22 may be any suitable photovoltaic module capable of generating electrical energy from sunlight, such as monocrystalline silicon, polycrystalline silicon, thin-film, etc. The photovoltaic modules 22 define a top surface 22a and an opposite, bottom surface 22b. As can be appreciated, the top surface 22a of the photovoltaic modules 22 includes the photovoltaic cells (not shown) while the bottom surface 22b includes any suitable means for fixedly or selectively coupling the photovoltaic modules 22 to the plurality of support beams 30, such as mechanical fasteners (e.g., bolts, nuts, etc.), adhesives, welding, etc. In aspects, the photovoltaic cells may be disposed within a suitable frame (FIGS. 3 and 4) which includes suitable means for fastening the photovoltaic modules 22 to the plurality of support beams 30. In this manner, the frame may include fastening means on a bottom surface thereof, or clamps or other suitable fasteners (e.g., Z-brackets, C-clamps, angle brackets, etc.) may be utilized to abut a portion of the frame and selectively or fixedly couple the frame to the plurality of support beams 30.

Figure 3:
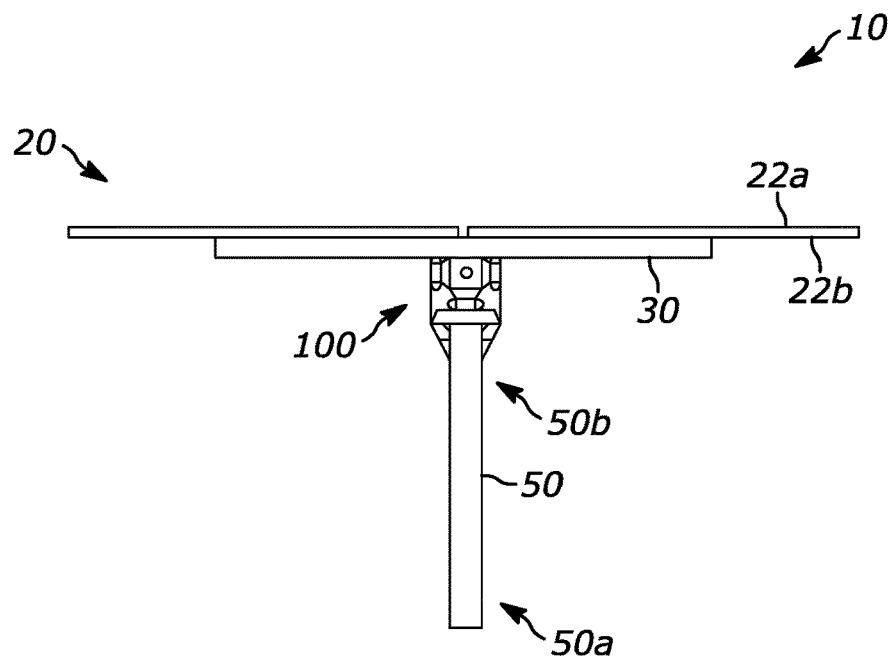
FIG. 3 is an end view of the solar tracking system of FIG. 1 shown with a solar array of the solar tracking system in a horizontal orientation.
Figure 4:
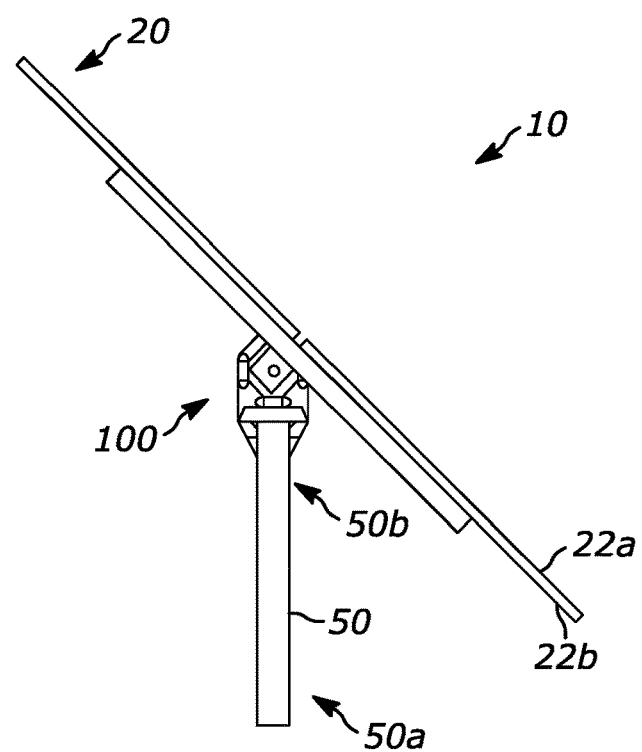
FIG. 4 is a side view of the solar tracking system of FIG. 1 shown with the solar array of the solar tracking system in an articulated orientation.

Turning to FIGS. 3 and 4, each base of the plurality of bases 50 is substantially similar and, thus, only one base 50 will be described in detail hereinbelow in the interest of brevity. The base 50 is shown generally as being an I-beam, although it is contemplated that any suitable type of beam may be used, such as a U-channel, Box tubes, round tubes, etc. Each base 50 includes a first end portion 50a that is configured to be anchored in the ground or to a stationary object and a second, opposite end portion 50b that is configured to selectively or fixedly couple to a portion of the articulation system 100, as will be described in further detail hereinbelow. It is contemplated that the base 50 may be formed from any material suitable for use outdoors and ground contact, such as steel (e.g., galvanized, stainless, etc.), aluminum, composites, polymers, etc.

Although generally illustrated as being supported at a geometric center of rotation, it is contemplated that the solar array 20 may be rotatably supported at a center of mass. In this manner, the mass of the solar array 20 is balanced about the plurality of bases 50 and the torque required to rotate the solar array about the plurality of bases remains substantially consistent, with little to no variation in the torque required to articulate the solar array 20 through its range or motion. As such, the amount of energy required to articulate the solar array 20 is reduced and the various components required to support the solar array 20 may be substantially similar (e.g., no need to design certain components to take a larger load than others), thereby reducing design time and reducing the number of differing components in the solar tracking system 10.

Figure 5:
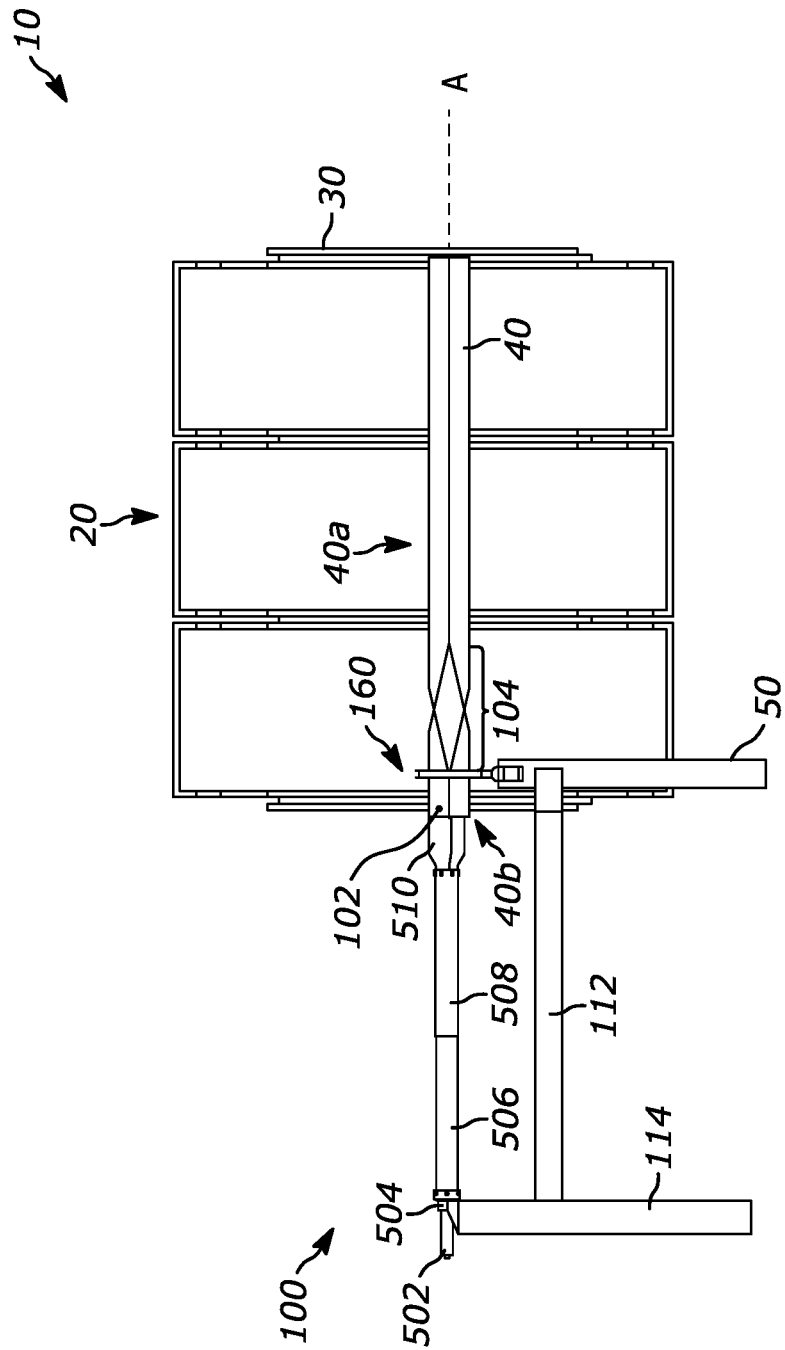
FIG. 5 is a side view of a portion of the solar tracking system of FIGS. 1 and 2 showing an articulation system in an extended position.
Figure 6:
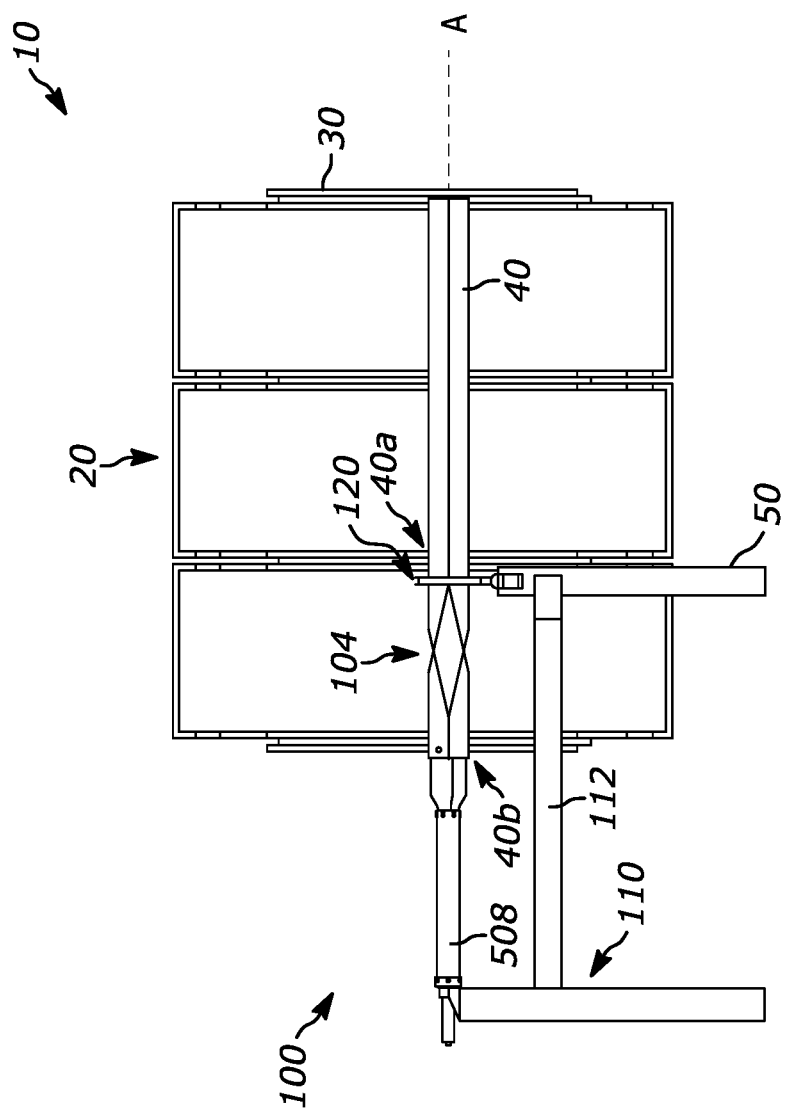
FIG. 6 is a rear view of the portion of the solar tracking system of FIGS. 1 and 2 showing the articulation system in a retracted position.

Referring to FIGS. 5 and 6, the torque tube 40 includes a first linear portion 40a, a helical portion 104, a second linear portion 40b, and an end portion 102 along the longitudinal axis A-A. The first and second linear portions 40a, 40b of the torque tube 40 define a generally rectangular profile, although it is contemplated that the first and second linear portions 40a, 40b of the torque tube 40 may define any suitable profile capable of transmitting torque to the solar array 20, such as square, oval, hexagon, hexalobe, etc.

In some aspects, the helical portion 104 may be a separate helical torque tube and the first and second linear portions 40a, 40b may be first and second linear torque tubes, respectively. Accordingly, the helical torque tube may selectively or fixedly engage the first and second linear torque tubes. It is contemplated that first and second torque tubes may be coupled to respective end portions of the helical tube using any suitable means, such as fasteners, friction fit, adhesives, welding, etc.

The articulation system 100 according to aspects of the present disclosure includes the helical portion 104 of the torque tube 40, a support structure 110, an active articulation system 140 including a screw drive assembly, and a passive articulation system 160. The helical portion 104 follows a helical arc wound about the longitudinal axis A-A such that the helical portion 104 completes approximately one revolution (e.g., twisted approximately 90 degrees over its length). In one non-limiting aspect, the helical portion 104 may define a helical arc that is wound about the longitudinal axis A-A approximately 100 degrees, although it is envisioned that the helical portion 104 may complete any number of revolutions (e.g., greater or less than one revolution) depending upon the installation needs of the solar tracking system 10. As can be appreciated, the pitch of the helical portion 104 (e.g., the length over which the helical portion 104 completes one revolution) determines the amount of force required to translate, and thereby rotate, the helical portion 104 through a respective support cam, as will be described in further detail hereinbelow. As such, the pitch of the helical portion 104 may be adjusted and/or optimized to require smaller or larger motors, components, etc. In this manner, a larger pitch (e.g., longer helical portion 104) would require less force to cause rotation of the torque tube 40. However, the limited space in which the articulation system 100 may be placed in the solar tracker system 10 limits the length of the pitch, and in one non-limiting aspect, the pitch utilized causes the torque tube 40 to rotate approximately 100 degrees over a length of approximately 35 inches.

The support structure 110 is disposed at one of the ends of the solar array 20 and includes a horizontal beam 112 and a vertical beam 114. It is contemplated that the horizontal beam 112 and the vertical beam 114 may be any suitable beam, such as an I-beam, C-channel, box tube, circular tube, etc. In non-limiting aspects, the horizontal beam 112 and the vertical beam 114 may be the same type of beam or different beams. The horizontal beam 112 is selectively or fixedly coupled to the base 50 using any suitable means, and in one non-limiting aspect is coupled to the base 50 by shear plates. The vertical beam 114 is selectively or fixedly coupled to the horizontal beam 112 using any suitable means, and in one non-limiting aspect is coupled to the horizontal beam 112 by shear plates. Aspects of the solar tracker system 10 of this disclosure may incorporate one or more features of the torque tube, the support structure, and the passive articulation system disclosed in U.S. application Ser. No. 16/002, 273, the entire contents of which are incorporated herein by reference.

As illustrated in FIG. 5, the active articulation system 140 includes an electric motor 502, a mount assembly 504, an outer tube 506, a sleeve 508, and a torque tube connector 510 fixedly coupled to the sleeve 508 via fastener 708. In aspects, the fastener 708 may include or be replaced by a rivet, an adhesive, a weld, or any other suitable means for fixedly coupling the torque tube connector 510 to the sleeve 508. The mount assembly 504 is used to mount the electric motor 502 to the power screw driver assembly and to mount the power screw driver assembly on the support structure 110. The torque tube connector 510 is coupled to the end portion 102 of the torque tube 40. In some non-limiting aspects, the torque tube connector 510 is a hollow tube having the same general shape as the end portion 102 of the torque tube 40 and having a size greater than the size of the end portion 102 so that the torque tube connector 510 and the end portion of the torque tube 40 can mate together and be fastened together using any suitable means, e.g., through welding or using nuts and bolts.

FIG. 5 illustrates the articulation system 100 in an extended state where the torque tube 40 is positioned such that the tube support 120 supports the torque tube 40 between the helical portion 104 and the second linear portion 40b. FIG. 6 illustrates the articulation system 100 in a retracted state where the torque tube 40 is positioned such that the tube support 120 supports the torque tube 40 between the helical portion 104 and the first linear portion 40a. As the articulation system 100 retracts from the extended state (FIG. 5) to the fully retracted state (FIG. 6), the sleeve 508 slides over the outer tube 506. In other words, the outer tube 506 telescopes into the sleeve 508.

Figure 7A:
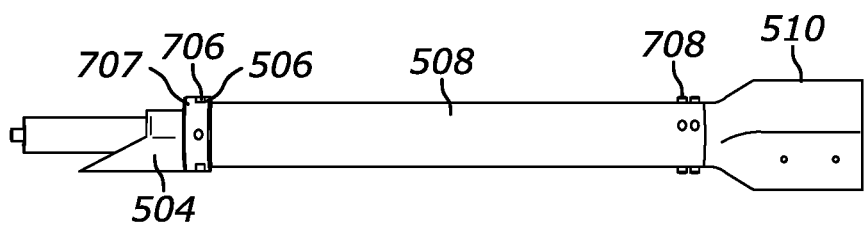
FIG. 7A is a side view of the drive assembly of FIGS. 5 and 6, shown in a retracted position.

FIG. 7A is a side view of the drive assembly of FIGS. 5 and 6, shown in a retracted position. The drive assembly includes a collar 707 coupled the mount assembly 504. The collar 707 is coupled to the outer tube 506 by fasteners 706. The sleeve 508 is coupled to the torque tube connector 510 by fasteners 708.

Figure 7B:
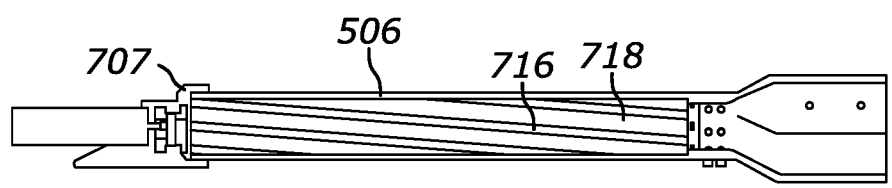
FIG. 7B is a cross-sectional, side view of the drive assembly of FIG. 7A without various internal components of the screw drive subassembly.
Figure 7C:
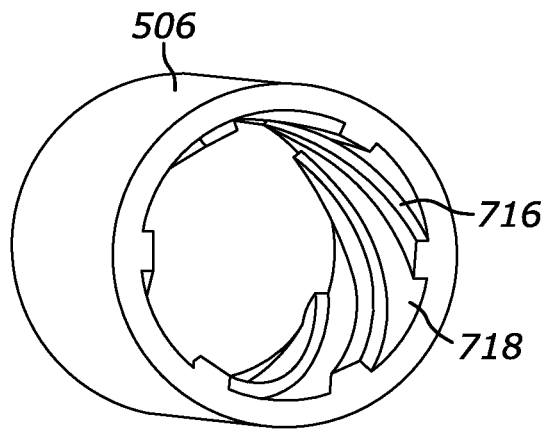
FIG. 7C is a cross-sectional, perspective view of the outer tube of FIG. 7B.

As illustrated in FIGS. 7B and 7C, the helical ridges 716 and grooves 718 follow a helical arc wound about the central longitudinal axis of the outer tube 506. The helical ridges 716 and grooves 718 may complete approximately one revolution. For example, the helical ridges 716 and grooves 718 may be twisted approximately 90 to 100 degrees over the length of the outer tube 506. Although it is envisioned that the helical ridges 716 and grooves 718 may complete any number of revolutions (e.g., greater or less than one revolution) depending upon the installation needs of the solar tracking system 10. In aspects, the number of revolutions of the helical ridges 716 and grooves 718 matches or is approximately equal to the number of revolutions of the helical portion 104 of the torque tube 40.

Figure 7D:
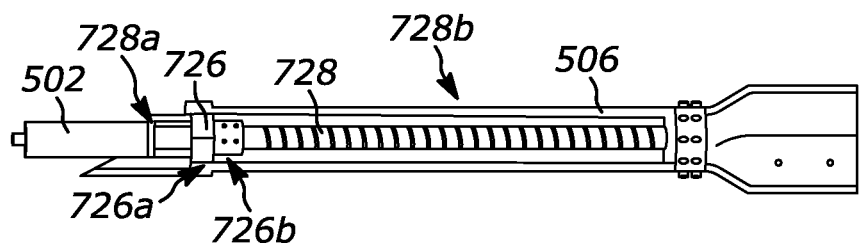
FIG. 7D is a partial cross-sectional, side view of the drive assembly of FIG. 7A without the sleeve and inner tube.

FIG. 7D is a partial cross-sectional, side view of the drive assembly of FIG. 7A, illustrating the screw drive subassembly. The screw drive subassembly includes a lead screw or screw rod 728 having a non-threaded portion 728a and a threaded portion 728b. The threaded portion 728b of the screw rod 728 may define any suitable threadform (e.g., square, trapezoidal, buttress, etc.) capable of supporting and transmitting large loads, although other threadforms are also contemplated, such as triangular threadforms (e.g., uniform thread standard, etc.). In aspects, the screw rod 728 may be a ball screw, a glidescrew, a leadscrew, etc. In one non-limiting aspect, the threaded portion 728b of the screw rod 728 defines a trapezoidal threadform such as an acme threadform and may have self-locking or anti-backdrive properties sufficient to inhibit the screw rod 728 from rotating under the static weight of the solar array 20 and the support beams 30 (e.g., the static weight of the solar array 20 and the support beams 30 applies a torque to the torque tube 40, which may generate an axial force on the screw rod 728). Additionally, the anti-backdrive properties of the screw rod 728 inhibit the screw rod 728 from rotating when an external force is applied to the solar tracking system 10, such as wind, snow, wildlife, etc.

Figure 7E:
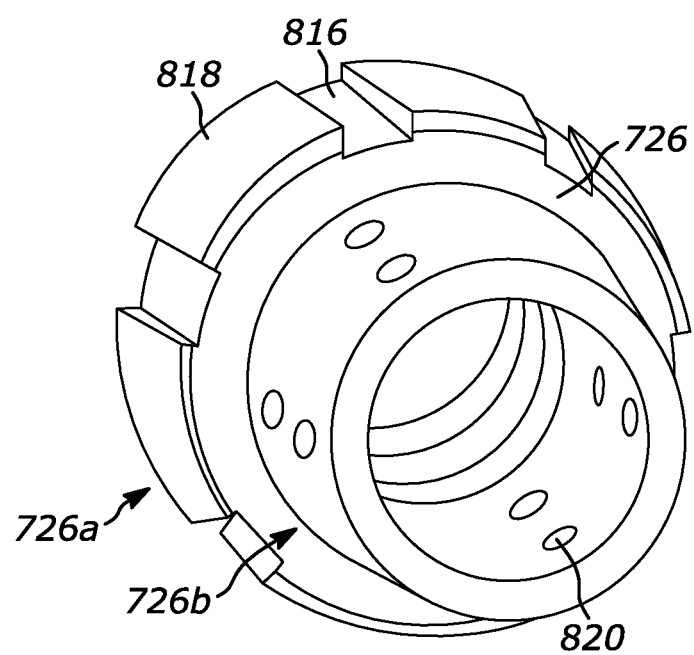
FIG. 7E is a perspective view of the nut of FIG. 7D.

The screw drive assembly also includes a nut 726 with a threaded inner surface that mates with the threaded portion of the rod 728. As illustrated in FIGS. 7D and 7E, the nut 726 includes a first portion 726a having a larger diameter than a second portion 726b. The outer surface of the first portion 726a of the nut 726 includes grooves 816 and ridges 818 that mate with ridges 716 and grooves 718, respectively.

The non-threaded portion 728a of the rod 728 is coupled to a shaft of the electric motor 502. Thus, when the electric motor is activated to cause the shaft to rotate in a first direction, the rotating threaded portion 728b of the rod 728 applies a force to the threads of the nut 726 to cause the nut 726 to translate to the right while the helical ridges 716 and grooves 718 of the outer tube 506 cause the nut 726 to also rotate. The helical ridges 716 and grooves 718 of the outer tube 506 may cause the nut 726 to rotate in the first direction (e.g., a clockwise direction) or in a second different direction (e.g., a counter-clockwise direction) when the nut 726 translates to the right. When the electric motor is activated to cause the shaft to rotate in the second direction, the rotating threaded portion 728b of the rod 728 causes the nut 726 to translate to the left while the helical ridges 716 and grooves 718 of the outer tube 506 cause the nut 726 to also rotate.

Figure 7F:
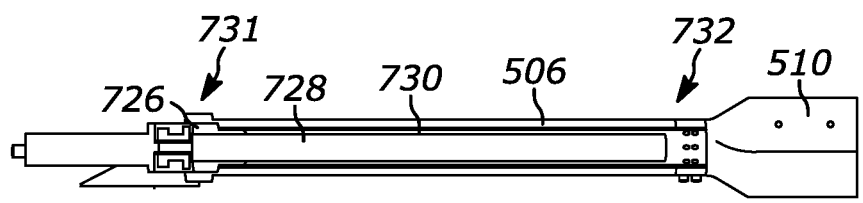
FIG. 7F is a cross-sectional, side view of the drive assembly of FIG. 7A without the sleeve.
Figure 7G:
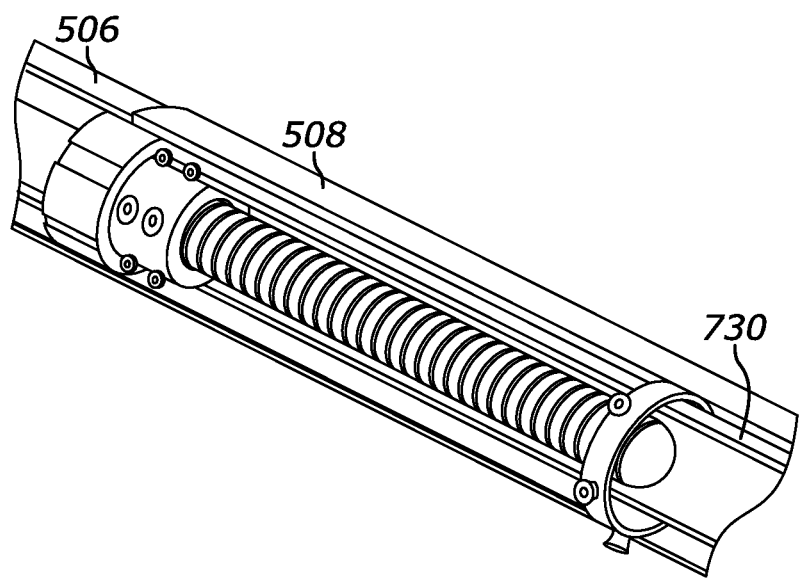
FIG. 7G is a partial, cross-sectional, side view of the drive assembly of FIG. 7A, illustrating the drive assembly in a partially extended state.

As illustrated in FIGS. 7F and 7G, the screw drive assembly also includes an inner arm tube or inner tube 730 having a first end portion 731 and a second end portion 732. The first end portion 731 of the inner tube 730 is coupled to the second portion 726b of the nut 726. For example, the first end portion 731 of the inner tube 730 may be fastened to the second portion 726b of the nut 726 via the apertures or holes 820 (FIG. 7E) in the second portion 726b using a fastener, e.g., a bolt. The second end portion 732 of the inner tube 730 is coupled to the torque tube connector 510. Thus, translation and rotation of the nut 726 causes the torque tube connector 510 to translate and rotate via the nut 726 applying a translation and rotation force to the inner tube 730.

Figure 8A:
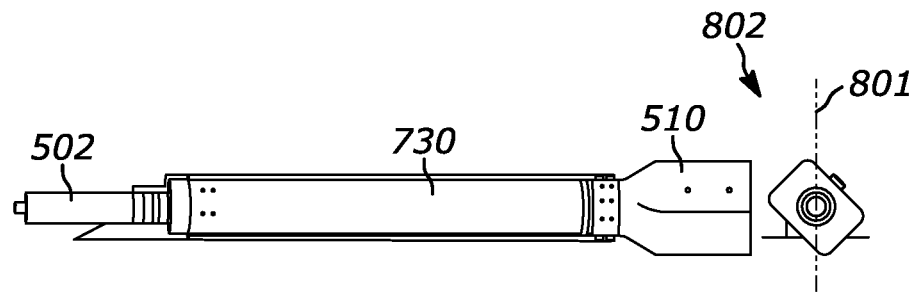
FIGS. 8A-8C are partial cross-sectional, side views of a drive assembly showing the extension of the drive assembly of FIG. 7A.
Figure 8B:
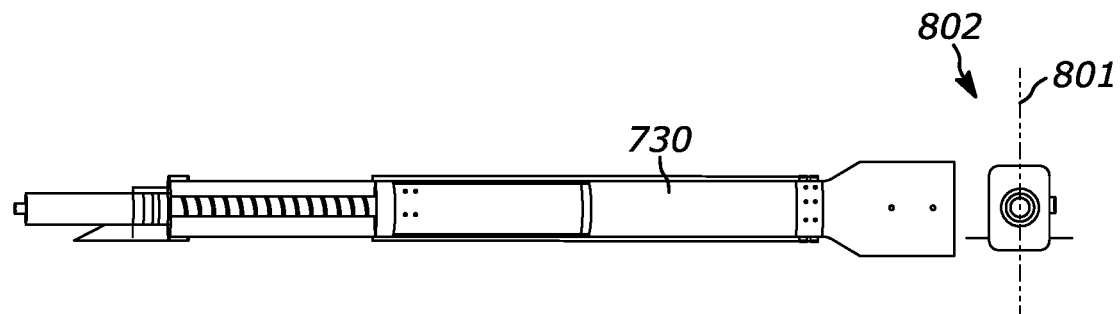
Figure 8C:
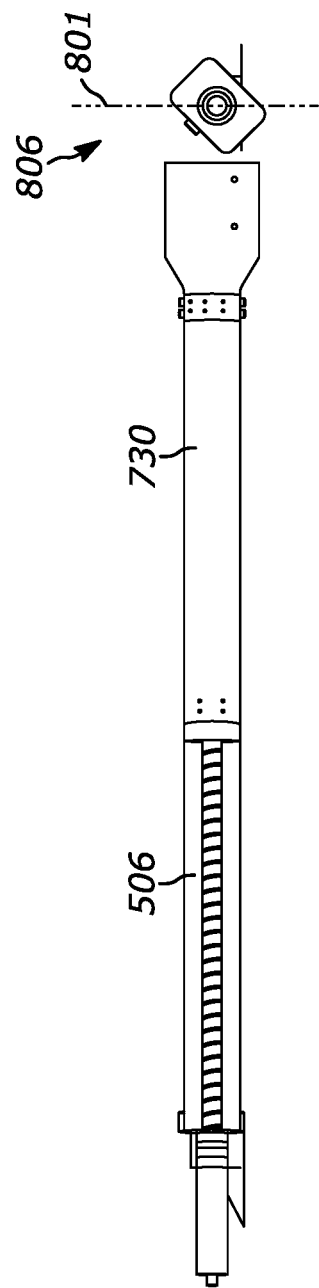

As illustrated in FIGS. 8A-8C, when the drive assembly is in the fully retracted state shown in FIG. 8A and the electric motor 502 rotates the screw rod 728 in a first direction, the nut 726 translates to the right and rotates clockwise, thus causing the inner tube 730 and the torque tube connector 510 to translate to the right and rotate clockwise. In this manner, the drive assembly extends from a fully retracted state shown in FIG. 8A, to a partially extended state shown in FIG. 8B, to a fully extended state shown in FIG. 8C. In aspects, as the drive assembly extends from the fully retracted state shown in FIG. 8A to the fully extended state shown in FIG. 8C, the torque tube connector 510 rotates from a first angle 802 with respect to the vertical axis 801, to a vertical position 804, to a second angle 806 with respect to the vertical axis 801, which drives the rotation of the torque tube 40, and thus the solar array 20. The first and second angles 802, 806 may be any angles suitable for producing electricity by the solar array 20 as the sun travels East to West. The first and second angles 802, 806 may be angles that maximize the production of electricity by the solar array 20. In one aspect, the first angle is −45 degrees and the second angle is +45 degrees. In another aspect, the first angle is −60 degrees and the second angle is +60 degrees.

Conversely, when the drive assembly is in the fully extended state shown in FIG. 8C and electric motor 502 rotates the screw rod 728 in a second direction, the nut 726 translates to the left and rotates counter clockwise, thus causing the inner tube 730 and the torque tube connector 510 to translate to the left and rotate counter clockwise. In this manner, the drive assembly retracts from a fully extended state shown in FIG. 8C, to a partially extended or partially retracted state shown in FIG. 8B, to a fully retracted state shown in FIG. 8A.

Figure 9A:
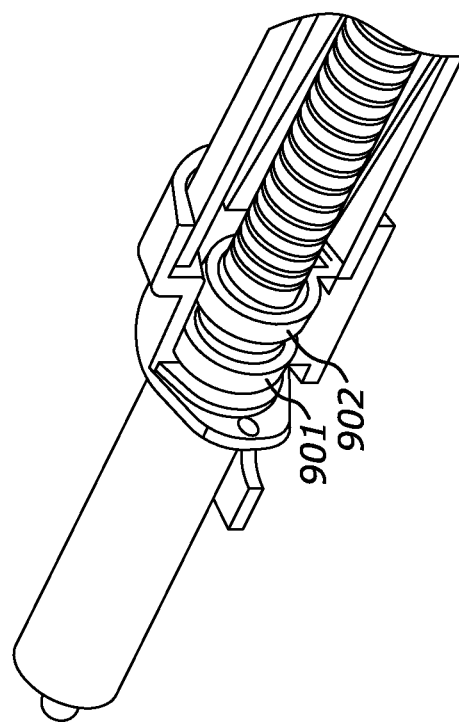
FIG. 9A is a partial, cross-sectional, perspective view of a portion of the drive assembly of FIG. 7A, illustrating a double roller bearing assembly.
Figure 9B:
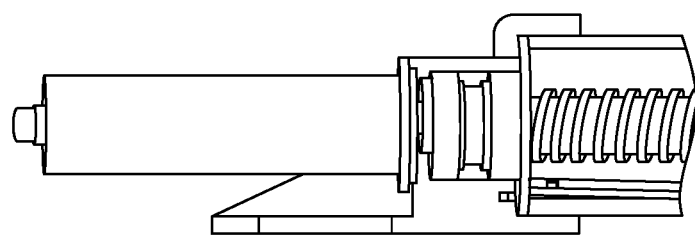
FIG. 9B is a partial, cross-sectional, side view of a portion of the drive assembly of FIG. 7A, illustrating the double roller bearing assembly.
Figure 9C:
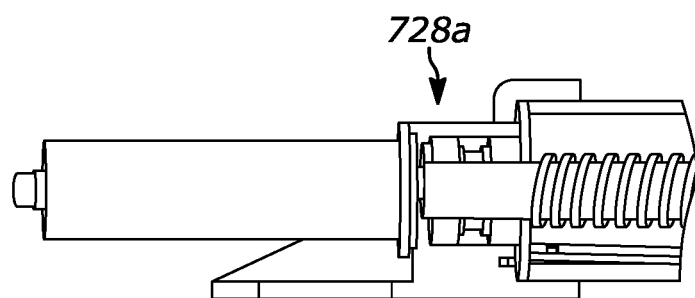
FIG. 9C is a partial, cross-sectional, side view of a portion of the drive assembly of FIG. 7A, illustrating a cross-section of the double roller bearing assembly.

FIGS. 9A-9C show a double roller bearing assembly including a first roller bearing assembly 901 and a second roller bearing assembly 902 disposed around the non-threaded portion 728a of the screw rod 728 (FIG. 7D). The first and second roller bearing assemblies 901, 902 may include thrust ball bearings, cylindrical thrust roller bearings, tapered roller thrust bearings, or spherical roller thrust bearings to support the screw rod 728. A collar in the middle that is bolted in place.

Figure 10A:
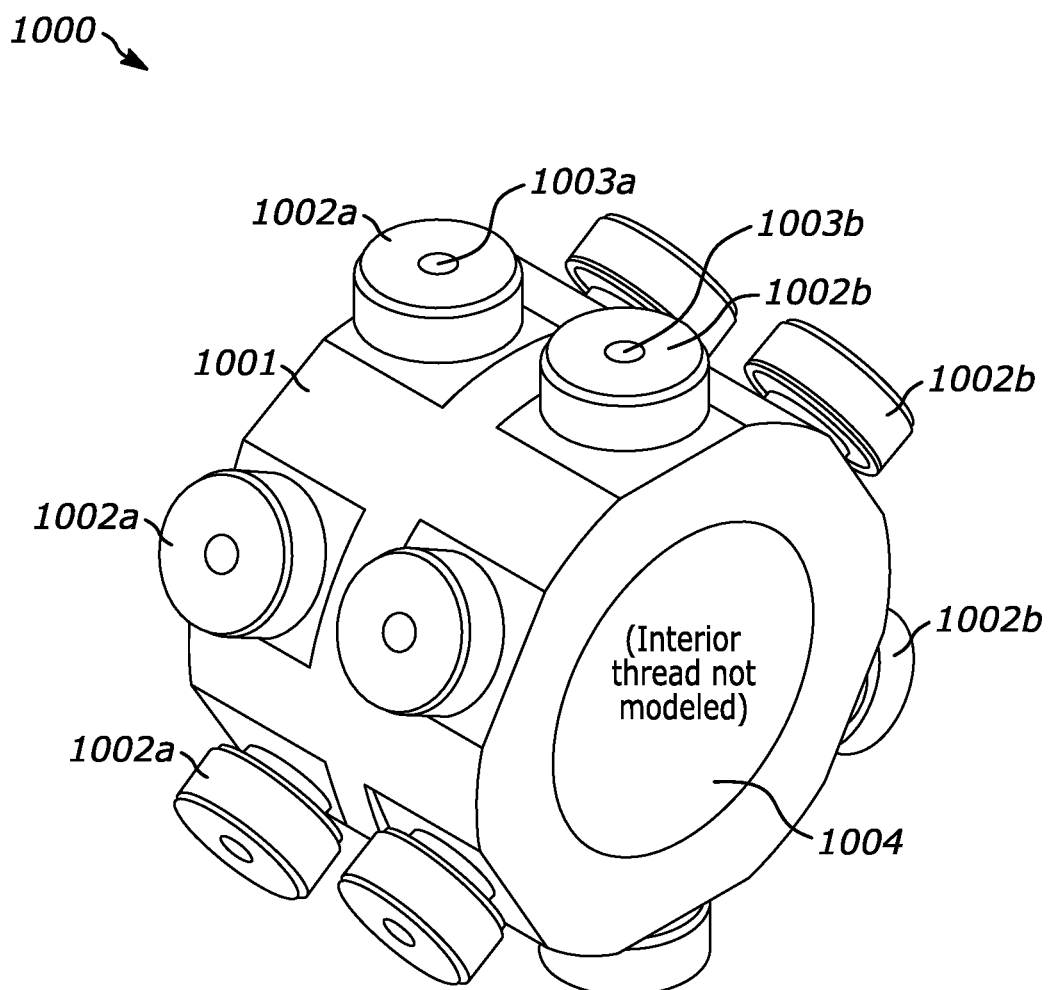
FIG. 10A is a perspective view of a nut according to another aspect of the disclosure.
Figure 10B:
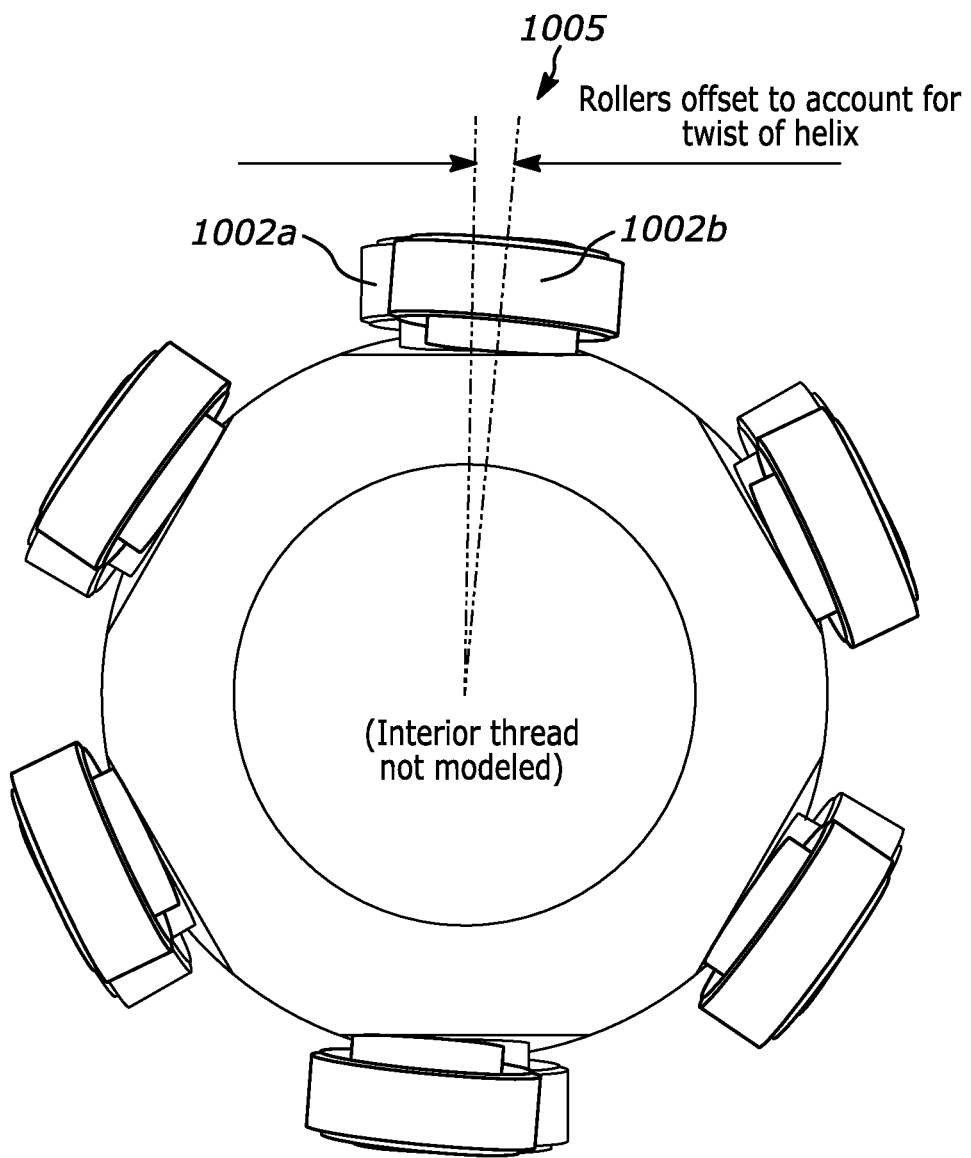
FIG. 10B is a side view of the nut of FIG. 10A.
Figure 10C:
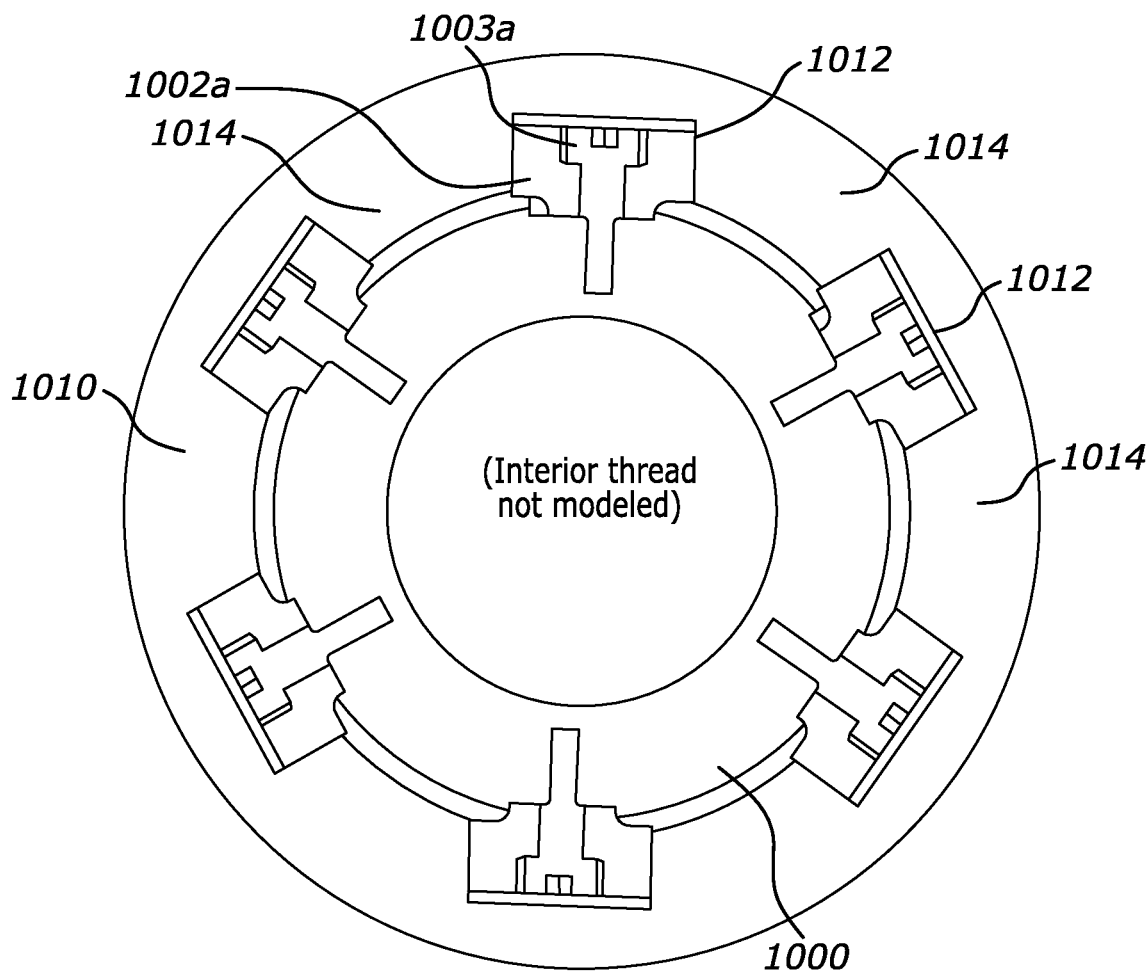
FIG. 10C is a cross-sectional, side view of the nut of FIG. 10A disposed inside a barrel.

FIGS. 10A-10C illustrate a nut 1000 according to another aspect of the disclosure. The nut 1000 is similar to the nut 726 of FIG. 7E except that the ridges 818 of FIG. 7E are replaced by rollers 1002a, 1002b. As illustrated in FIG. 10C, the rollers 1002a, 1002b are configured to travel in grooves 1012 of the barrel 1010 between corresponding pairs of ridges 1014 similar to the ridges 716 of FIG. 7C. In some aspects, the rollers 1002a, 1002b may be replaced with sliders, a combination of rollers and sliders, or any other suitable objects that can fit in and easily travel in the grooves 1012. The nut 1000 includes a first set of six rollers 1002a arranged around an exterior portion 1001 of the nut 1000 and a second set of six rollers 1002a arranged around the exterior portion 1001 of the nut 1000 adjacent to the first set of six rollers 1002a. The rollers 1002a, 1002b may be coupled to the exterior portion 1001 through respective axles 1003a, 1003b, which may be attached to the exterior portion 1001 of the nut 1000. In this configuration, the rollers 1002a, 1002b are able to rotate around respective axles 1003a, 1003b as the rollers 1002a, 1002b travel through respective grooves 1012. The interior portion 1004 of the nut 1000 may include threads that mate with the threads of the screw rod 728

As illustrated in FIG. 10B, the second set of rollers 1002b are radially offset from the first set of rollers 1002a by a predetermined angle 1005 to account for the twist of the helical grooves 1012 (e.g., the helical grooves 718 illustrated in FIG. 7C). In other aspects, there may be fewer or greater numbers of rollers in each set and/or there may be fewer or greater numbers of sets of rollers. For example, in one aspect, there may be three sets and there may be four rollers in each of those sets.

Figure 11A:
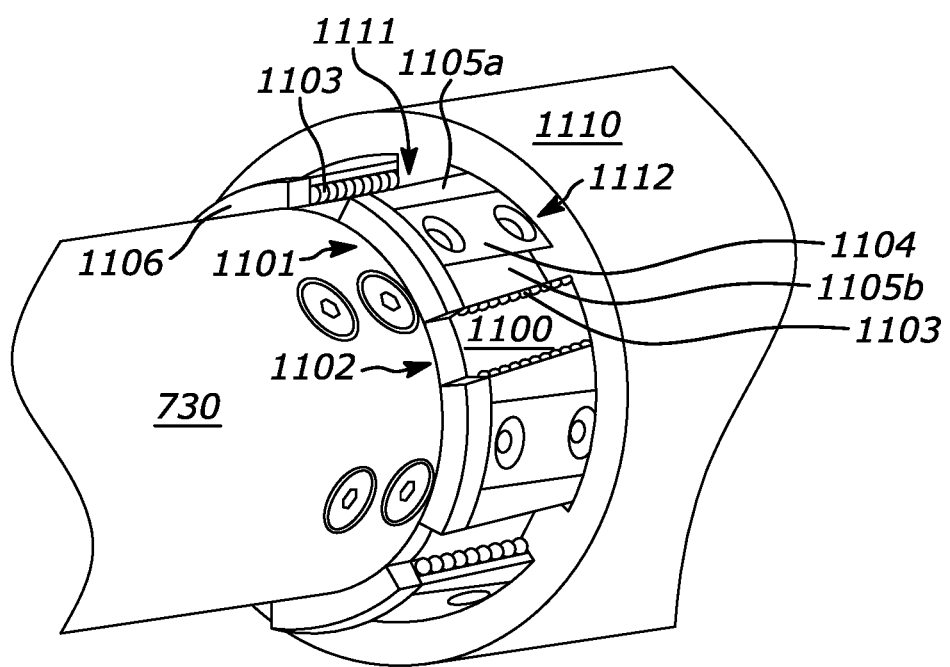
FIG. 11A is a partial, cross-sectional, perspective view of a drive assembly including a linear recirculating ball bearing path according to yet another aspect of the disclosure.
Figure 11B:
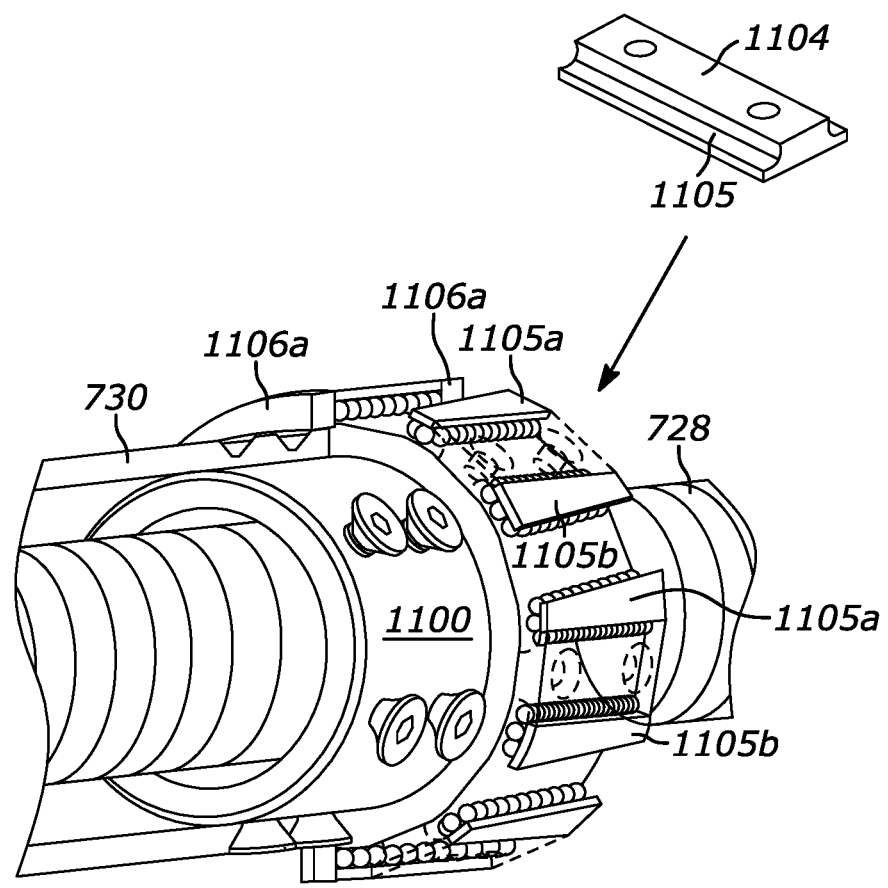
FIG. 11B is a another partial, cross-sectional, perspective view of the drive assembly of FIG. 11A.

FIGS. 11A and 11B illustrate a drive assembly including a linear recirculating ball bearing path according to yet another aspect of the disclosure. The drive assembly includes a nut assembly 1100 coupled to the inner tube 730 and a barrel or outer tube 1110 having an inner portion that mates with the outer portion of the nut assembly 1100. The nut assembly 1100 includes a ridge 1101 that mates with a groove 1112 in the inner portion of the outer tube 1110 and a groove 1102 that mates with a ridge 1111 in the inner portion of the outer tube 1110.

The ridges 1101 include longitudinal sides forming a portion of a ball bearing path configured to receive multiple ball bearings. The ridges 1111 also include longitudinal sides forming another portion of the ball bearing path. The ridges 1101 also include a ridge cap 1106, which forms yet another portion of the ball bearing path in a radial direction. In other words, the longitudinal sides of the ridges 1101 and the ridges 1111 form a longitudinal portion of the ball bearing path, and the ridge caps 1106 and the front and back side portions of the ridges 1101 form radial portions of the ball bearing path.

As illustrated in FIG. 11B, the ridges 1101 of the nut assembly 1100 may include a first ridge 1105a, a second ridge 1105b, and a cap 1104 disposed between the first ridge 1105a and the second ridge 1105b. In this configuration, one of the sides of the first and second ridges 1105a, 1105b and respective sides of the cap 1104 form other longitudinal portions of the ball bearing path. The cap 1104 may include grooves 1105 configured to receive and provide a longitudinal portion of the ball bear path. In aspects, the widths of the first and second ridges 1105a, 1105b may taper in opposite directions. In other aspects, the widths of the first and second ridges 1105a, 1105b may by equal along the lengths of the first and second ridges 1105a, 1105b.

Figure 12A:
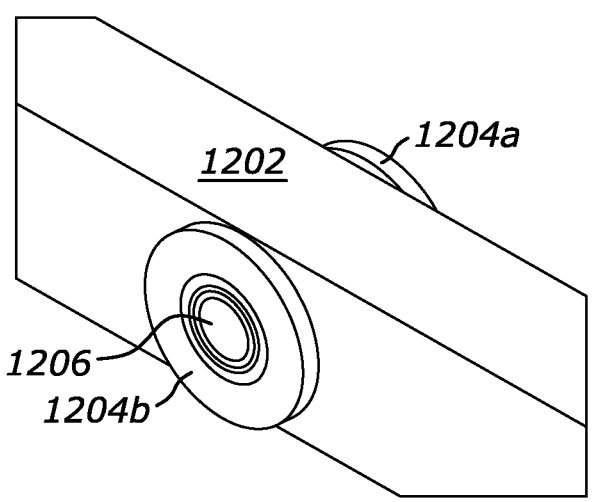
FIG. 12A is a perspective view of an inner tube of a drive assembly according to yet another aspect of the disclosure.

FIGS. 12A-12F illustrate aspects of a drive assembly and the operation of the drive assembly according to yet another aspect of the disclosure. As shown in FIG. 12A the drive assembly includes an inner tube 1202, an axle 1206, which extends through the inner tube 1202, and a pair of rollers 1204a, 1204b, which are coupled to end portions of the axle 1206 on opposite sides of the inner tube 1202. The inner tube 1202 is a different example of an inner tube that can be used in the articulation system 100 of FIGS. 5 and 6 instead of the inner tube 730 shown, for example, in FIGS. 7F, 7G, and 8A-8C. The pair of rollers 1204a, 1204b may include ball bearings 1205 or any other structures to facilitate the rotation of the pair of rollers 1204a, 1204b.

Figure 12B:
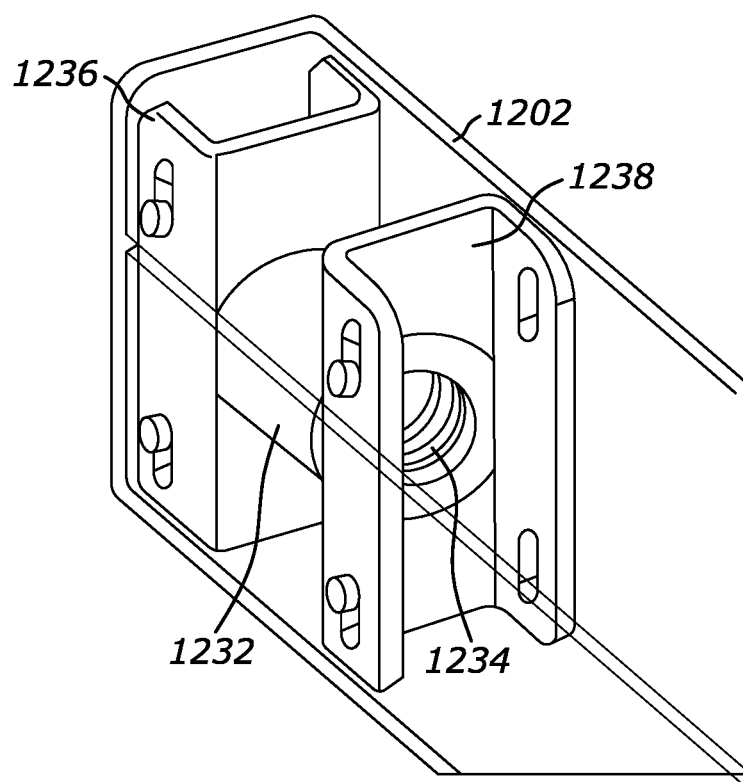
FIG. 12B is a phantom, perspective view of an end portion of the inner tube of FIG. 12A.
Figure 12D:
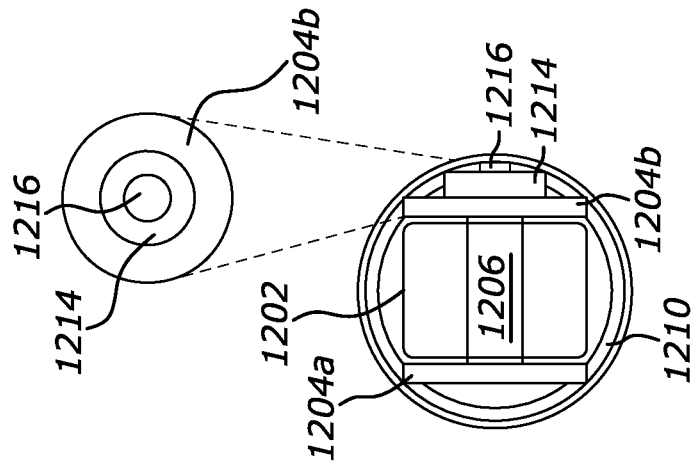
FIG. 12D is a cross-sectional, side view of the portion of the drive assembly of FIG. 12B.
Figure 12C:
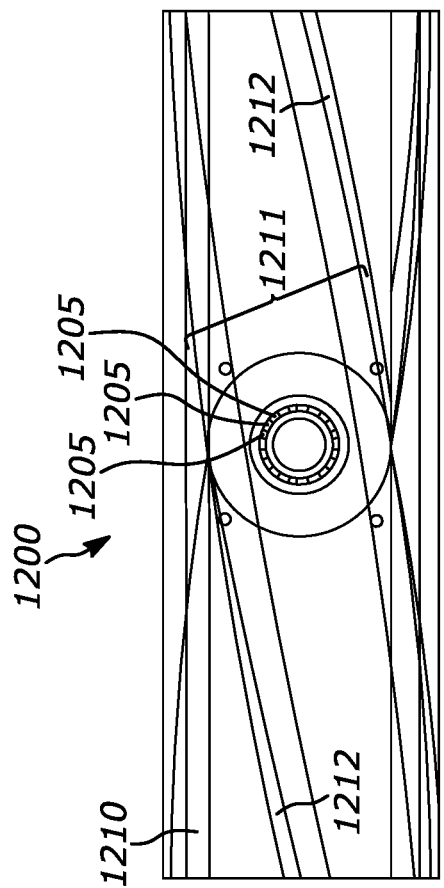
FIG. 12C is a phantom, front view of a portion of the drive assembly incorporating the inner tube of FIG. 12A at a first position and orientation.

FIG. 12B shows an end portion of the inner tube 1202 of FIG. 12A. A nut 1232 having interior threads 1234 is disposed in the interior of the end portion of the inner tube 1202. The nut 1232 is secured to the interior surfaces of the inner tube 1202 using brackets 1236, 1238, which may have a shape that at least partially conforms to the shape defined by the interior surfaces of the inner tube 1202. The brackets 1236, 1238 may be affixed to at least one side of the inner tube 1202 by one or more welds, one or more fasteners, or any other suitable way to fix the position of the nut 1232 with respect to the end portion of the inner tube 1202. In aspects, the nut 1232 fits on and/or mates with the threaded portion 728b of the rod 728.

Figures 12E, 12F:
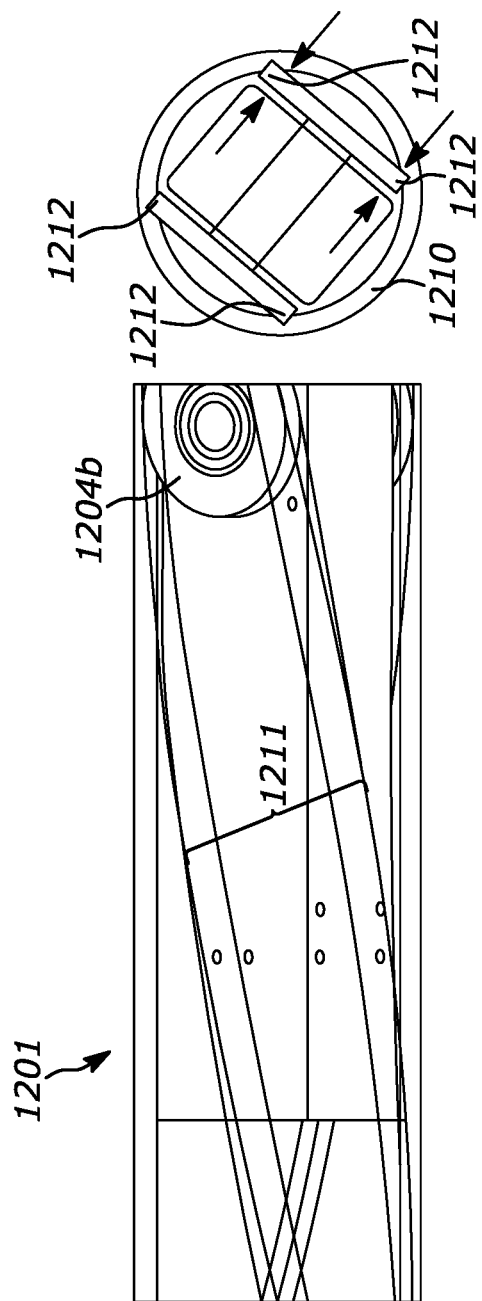
FIG. 12E is a phantom, front view of the portion of the drive assembly including the drive shaft of FIG. 12A at a second position and orientation.
FIG. 12F is a cross-sectional, side view of the portion of the drive assembly of FIG. 12D.

As shown in FIGS. 12C-12F, the pair of rollers 1204a, 1204b fit in a pair of helical-shaped tracks 1211, respectively, formed on opposite sides of the outer tube 1210 and extending along at least a portion of a length of the outer tube 1210, which is similar to the outer tube 506 of FIGS. 7A-7F. Each of the helical-shaped tracks 1211 is formed by opposing grooves 1212 in the inner surface of the outer tube 1210. When an electric motor is activated to cause the shaft and hence the rod 728 to rotate, the threaded portion 728b of the rod 728 applies a force to the threads of the nut 1232 to cause the nut 1232 and the inner tube 1202 to translate in a rightward direction. As the inner tube 1202 translates, the pair of rollers 1204a, 1204b rotate and/or slide within the pair of tracks 1211, respectively, thus causing the inner tube 1202 to rotate from a first orientation at state 1200 (FIGS. 12C and 12D) to a second orientation at state 1201 (FIGS. 12E and 12F).

In aspects, the grooves 1212 may be coated with a suitable material to facilitate the rolling and/or the sliding of the rollers 1204a, 1204b in the grooves 1212. In aspects, one or more additional, stepped rollers 1214, 1216 may be disposed adjacent to either or both of the rollers 1204a, 1204b. The stepped rollers 1214, 1216 may be coupled to end portions of the axle 1206.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects.

What is claimed is:

1. An articulation assembly comprising:
    an outer tube having helical grooves in an inside portion of the outer tube;
    a screw rod disposed within the outer tube;
    a nut having threads configured to mate with threads of the screw rod such that rotation of the screw rod drives translation of the nut along a length of at least a portion of the screw rod, and having ridges configured to directly mate with and slide through the helical grooves of the outer tube such that the helical grooves rotate the nut as the nut translates along the length of the at least a portion of the screw rod; and
    an inner tube fixedly coupled to the nut and configured to fixedly couple to a torque tube coupled to a solar array such that the rotation of the screw rod drives the translation and rotation of the nut, which drives the translation and rotation of the solar array through the inner tube and the torque tube.

2. The articulation assembly of claim 1, further comprising an electric motor, which when activated, causes the screw rod to rotate.

3. The articulation assembly of claim 1, further comprising:
    a helical tube coupled to the torque tube; and
    a helical tube support configured to slidably support the helical tube,
    wherein actuation of an electric motor causes the helical tube to translate within the helical tube support, the helical tube support configured to rotate the helical tube as the helical tube is translated in the helical tube support to cause a corresponding rotation of the solar array.

4. The solar tracking system according to claim 3, wherein a rotation and/or a length of the helical grooves match a rotation and/or a length, respectively, of the helical tube.

5. The solar tracking system according to claim 1, further comprising double roller bearings disposed around a non-threaded portion of the screw rod.

6. The solar tracking system according to claim 1, further comprising a sleeve having a diameter greater than the diameter of the outer tube, an end portion of the sleeve coupled to an end portion of the torque tube, the sleeve configured to cover the inner tube when the solar tracking system is in an extended position.

\* \* \* \* \*